United States Patent
Berger et al.

(10) Patent No.: US 6,259,353 B1
(45) Date of Patent: *Jul. 10, 2001

(54) TRANSPONDER COMMUNICATION DEVICE FOR THE CONTACTLESS COMMUNICATION WITH MOBILE TRANSPONDERS, INCLUDING MEANS FOR CARRYING OUT AN OPERATIONAL TEST, AND TRANSPONDER CONSTRUCTED AS AN OPERATIONAL-TEST TRANSPONDER

(75) Inventors: Dominik J. Berger; Max Staudinger, both of Graz (AT)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/078,819

(22) Filed: May 14, 1998

(30) Foreign Application Priority Data

May 16, 1997 (EP) .................................................. 97890090

(51) Int. Cl.[7] ...................................................... H04Q 5/22
(52) U.S. Cl. ................... 340/10.1; 340/10.2; 340/10.52; 340/10.6; 340/539; 340/573.1; 340/573.2; 340/573.4; 342/44
(58) Field of Search ................................. 340/10.1, 539, 340/573.1, 573.2, 573.4, 10.2, 10.52, 10.6; 714/25; 342/44

(56) References Cited

U.S. PATENT DOCUMENTS

| | | | |
|---|---|---|---|
| 4,918,432 | * | 4/1990 | Pauley et al. ................... 340/573.1 |
| 5,196,846 | | 3/1993 | Brockelsby et al. ................. 340/933 |
| 5,345,231 | | 9/1994 | Koo et al. ............................ 340/870 |
| 5,537,105 | * | 7/1996 | Marsh et al. ........................ 340/10.1 |
| 5,742,233 | * | 4/1998 | Hoffman et al. ..................... 340/539 |
| 5,745,049 | * | 4/1998 | Akiyama et al. ............... 340/870.17 |
| 5,751,570 | * | 5/1998 | Stobbe et al. .......................... 342/44 |
| 5,983,363 | * | 11/1999 | Tuttle et al. ............................ 714/25 |

FOREIGN PATENT DOCUMENTS

| | | |
|---|---|---|
| 07023324 | * 3/1996 | (EP) . |
| 10042374A | 2/1998 | (JP) . |
| WO8907802 | 8/1989 | (WO) . |

OTHER PUBLICATIONS

"A VLSI Architecture for Hierarchical Motion Estimation", by A. Costa et al., IEEE Transactions on Consumer Electronics, vol. 41, No. 2, May 1995, pp. 248–258.

\* cited by examiner

Primary Examiner—Brian Zimmerman
Assistant Examiner—Yves DaLencourt (57) ABSTRACT

A transponder communication device interrogates an operational test transponder that is permanently within a receiving range of the transponder communication device. In response thereto, the operational test transponder sends operational test information to the transponder communication device. The transponder communication device checks whether received operational test information is valid, and generates an error signal if the received operational test information is invalid.

21 Claims, 4 Drawing Sheets

TRANSPONDER COMMUNICATION DEVICE FOR THE CONTACTLESS COMMUNICATION WITH MOBILE TRANSPONDERS, INCLUDING MEANS FOR CARRYING OUT AN OPERATIONAL TEST, AND TRANSPONDER CONSTRUCTED AS AN OPERATIONAL-TEST TRANSPONDER

BACKGROUND OF THE INVENTION

The invention relates to a transponder communication device for the contactless communication with mobile transponders, comprising interrogation means for generating at least one type of interrogation information by means of which mobile transponders, which are in an active state and which are situated within a receiving range of the transponder communication device, can each be requested to generate and transmit answer information, and transmission means for transmitting interrogation information to a mobile transponder situated within the receiving range, and receiving means for receiving answer information generated and transmitted by mobile transponders within the receiving range in response to the interrogation information of at least one type, and answer information detection means with the aid of which the presence of a mobile transponder within the receiving range can be detected depending on the occurrence of answer information of at least one type.

The invention further relates to a transponder for the contactless communication with a transponder communication device, which transponder is capable, when in an active state, of communicating with a transponder communication device, the transponder including receiving means for receiving at least one type of interrogation information transmitted by means of a transponder communication device and interrogation information detection means for detecting received interrogation information of at least one type and answer means controllable by the interrogation information detection means to generate answer information in response to received interrogation information detected by the interrogation information detection means, and transmission means for transmitting the answer information generated by the answer means.

Such a transponder communication device of the type defined in the first paragraph and such a transponder of the type defined in the second paragraph are known, for example from the document U.S. Pat. No. 5,345,231 A. As has been stated in said document, the known transponder communication device and the known transponder can be parts of a transponder system, which may be a toll collection system, an access control system, a tool changing system and the like. Particularly in those transponder systems in which the transponder communication device or an apparatus including the transponder communication device is accessible to the public, as for example in the case of public telephones having an integrated transponder communication device, it is necessary to check or test the proper working order of a transponder communication device included in a such a transponder system. To date such a test is carried out in such a manner that a qualified person trained for this personally carries out an on-site inspection of the transponder communication device, which is laborious and expensive.

SUMMARY OF THE INVENTION

It is an object of the invention to improve a transponder communication device of the type defined in the first paragraph and a transponder of the type defined in the second paragraph and to provide an improved transponder as well as an improved transponder communication device enabling the proper working order of such a transponder communication device to be tested at regular intervals in a simple and inexpensive manner. Moreover, the invention particularly aims at making the means required for this regular testing particularly reliable, trouble-free, vandal proof as well as simple.

To achieve the afore-mentioned objects, according to the invention, a transponder communication device of the type defined in the first paragraph is characterized in that the transponder communication device includes means for carrying out an operational test and the transponder communication device includes an operational test transponder arranged within the receiving range of the transponder communication device and also capable of communicating with the transponder communication device when mobile transponders are situated within the receiving range of the transponder communication device and including means for generating and means for transmitting operational test information which can be received by the receiving means of the transponder communication device, and the transponder communication device has operational test information detection means connected to the receiving means and adapted to detect the received operational test information transmitted by the operational test transponder also when mobile transponders are situated within the receiving range of the transponder communication device and with the aid of which error information can be generated when information which deviates from valid operational test information is detected. By means of the measures in accordance with the invention it is achieved that a regular test of the proper working order of a transponder communication device in accordance with the invention is possible in a simple manner. Moreover, the measures in accordance with the invention particularly lead to a very reliable, trouble-free, vandal proof as well as simple construction, for which during a testing process, i.e. an operational test, it is not necessary to first remove another mobile transponder from the transponder communication device to be tested and even a multitude of other mobile transponders may be situated within the receiving range of the transponder communication device in accordance with the invention without an operational test being affected or rendered impossible thereby, no mechanically moved parts being required to carry out a testing process, which leads to low manufacturing costs, a high dependability and reliability of operation.

It is to be noted that a read apparatus for non-stationary, i.e. mobile data memories, for example credit cards, is known from the document WO 89/07802A1. This known apparatus can be checked or tested continually as regards its proper working order in that a read head of the known apparatus, which in normal operation scans an external mobile data memory, is given access to a stationary test data memory in the absence of such an external mobile data memory, which stationary test data memory can be scanned by the read head of the known apparatus in the same way as a mobile data memory. In this known apparatus the read head can only scan either a mobile data memory or the stationary data memory. To enable the test data memory to be scanned for the purpose of testing, it is necessary to first remove a mobile data memory which may be present in the known apparatus. Moreover, for the known apparatus it is necessary to move either the read head or the test data memory mechanically in order to bring the read head and the test data memory in scanning engagement with one another. This requires mechanically movable parts, which leads top comparatively high manufacturing costs and a reduced dependability and reliability of operation. In contradistinction thereto, the transponder communication device in accordance with the invention enables both the operational test transponder and an arbitrary number of mobile transponders within the receiving range of the transponder communication device can be present at the same time without imposing thereby any restrictions on the process of operational testing, because with the aid of its interrogation means the transponder communication device can generate suitable interrogation information for carrying out an operational test, by means of which interrogation information only the operational test transponder can be interrogated to supply operational test information, in which case no communication takes place between the transponder communication device and all the other mobile transponders situated within the receiving range of the transponder communication device. In an embodiment of the invention, a transponder communication device includes memory means in which nominal operational test information is stored, which information can be applied to the operational-test-information detection means, and the operational-test-information detection means are adapted to compare the applied nominal operational test information with received operational test information transmitted by the operational test transponder. This has proved to be advantageous for a particularly simple and reliable detection of the received operational test information sent by the operational test transponder.

In a transponder communication device in accordance with the invention, it has further proved to be advantageous if in addition the means of the operational test transponder of the transponder communication device which are adapted to generate operational test information are formed by answer means of the operational test transponder, which answer means correspond to the answer means of the mobile transponder. In this way it is achieved that the hardware implementation of the operational test transponder can be wholly identical to the hardware implementation of the mobile transponder. In a further embodiment of the invention, the operational test transponder includes switching means with the aid of which the operational test transponder can be activated and deactivated. In this way it is achieved that the operational test transponder can readily be disabled and therefore cannot adversely affect the communication quality in the normal communication mode between the transponder communication device and a mobile transponder. In the further embodiment of the invention, the switching means can be switched, for example, by the actuation of a separate control means. In the case of a telephone device including an integrated transponder communication device in accordance with the invention these control means can be formed, for example, by the so-called cradle switch of the telephone device, which switch is actuated when the telephone receiver is lifted, as a result of which the operational test transponder is put into operation via the switching means each time that the telephone receiver is lifted and an operational test can be carried out prior to the actual operation in the normal mode. However, in the further embodiment of the invention, it has proved to be very advantageous if in addition a timing stage has been provided by means of which activation information can be generated successively with the aid of which the switching means of the operational test transponder can be switched so as to activate the operational test transponder. As a result, it is achieved that the operational test transponder is automatically put into operation to carry out an operational test at regular time intervals.

A transponder communication device in accordance with the invention, can advantageously have an operational test transponder fixedly connected to the transponder communication device. In a still further embodiment of the invention, the transponder communication device includes an exchangeable operational test transponder. In this way it is achieved in a simple manner that an operational test transponder mounted in a transponder communication device can readily be replaced by another operational test transponder. This is possible, for example, in the case that an EEPROM included in a mounted operational test transponder is already subject to a large number of access cycles or for the purpose of readily adapting the operational test conditions to different or new situations. Advantageously, a transponder communication device of the invention is combined with a telephony arrangement to form a telephone device and is adapted to control the telephony arrangement. Such an embodiment has proved to be very suitable and advantageous for practical uses.

According to the invention, in order to achieve the aforementioned objects, a transponder of the type defined in the second paragraph is characterized in that the transponder is formed by an operational test transponder and includes means for generating operational test information which can be transmitted to a transponder communication device by the transmission means. In this way it is achieved that such a transponder in accordance with the invention can be used as an operational test transponder in a suitable transponder communication device, such a transponder in accordance with the invention conceived as an operational test transponder enabling the proper working order of a transponder communication device to be tested in a very simple manner. In an embodiment of a transponder of the invention, the means for generating operational test information are advantageously formed by answer means of the transponder formed by an operational test transponder, which answer means correspond to the answer means of mobile transponders not formed by operational test transponders. This has the advantage that the hardware implementation of a transponder in accordance with the invention used as an operational test transponder can be wholly identical to the hardware implementation of mobile transponders. In another embodiment of a transponder of the invention, switching means have been provided by means of which the transponder equipped as an operational test transponder can be activated and deactivated. Thus, it is achieved in a simple manner that the transponder conceived as an operational test transponder can be rendered operative and inoperative in a simple and essentially arbitrary manner.

The above-mentioned as well as further aspects of the invention will become apparent from the embodiments described hereinafter by way of examples and will be elucidated by means of these embodiments.

BRIEF DESCRIPTION OF THE DRAWINGS

The invention will now be described in more detail with reference to the drawings, which shows two embodiments to which the invention is not limited.

DETAILED DESCRIPTION OF THE PREFERRED EMBODIMENT

Figure 1:
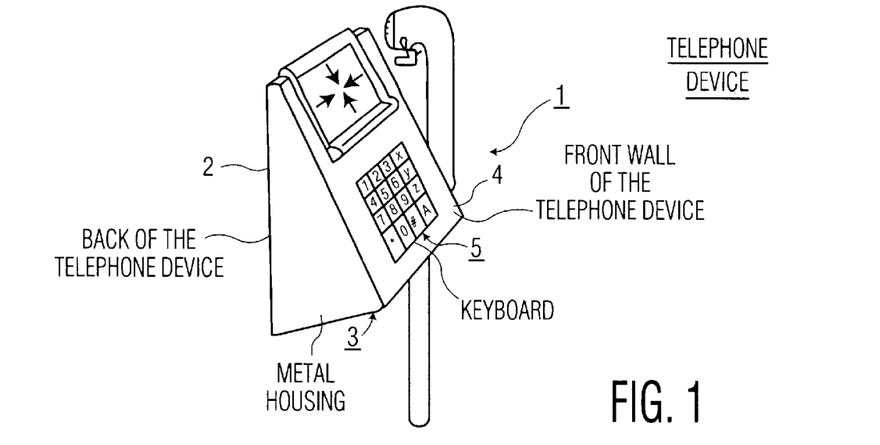
FIG. 1 is a diagrammatic oblique view showing a telephone device whose telephony arrangement has been combined with a transponder communication device in accordance with a first embodiment of the invention, the transponder communication device being adapted to control the telephony arrangement and including an operational test transponder.

FIG. 1 shows a telephone device 1 adapted to be mounted on a wall, not shown, the telephone device being mounted on the wall with its back 2. The telephone device 1 has a metal housing 3, which comprises a front wall 4 which is inclined with respect to the back 2. A keyboard 5 is arranged in the area of the front wall 4 and enables a desired telephone number to be entered into the telephony arrangement of the telephone device 1. The keyboard 5 has been arranged on a printed circuit board 6, which also carries the telephony arrangement 7, i.e. the electronic telephony arrangement, as is shown diagrammatically in FIG. 2.

Figure 2:
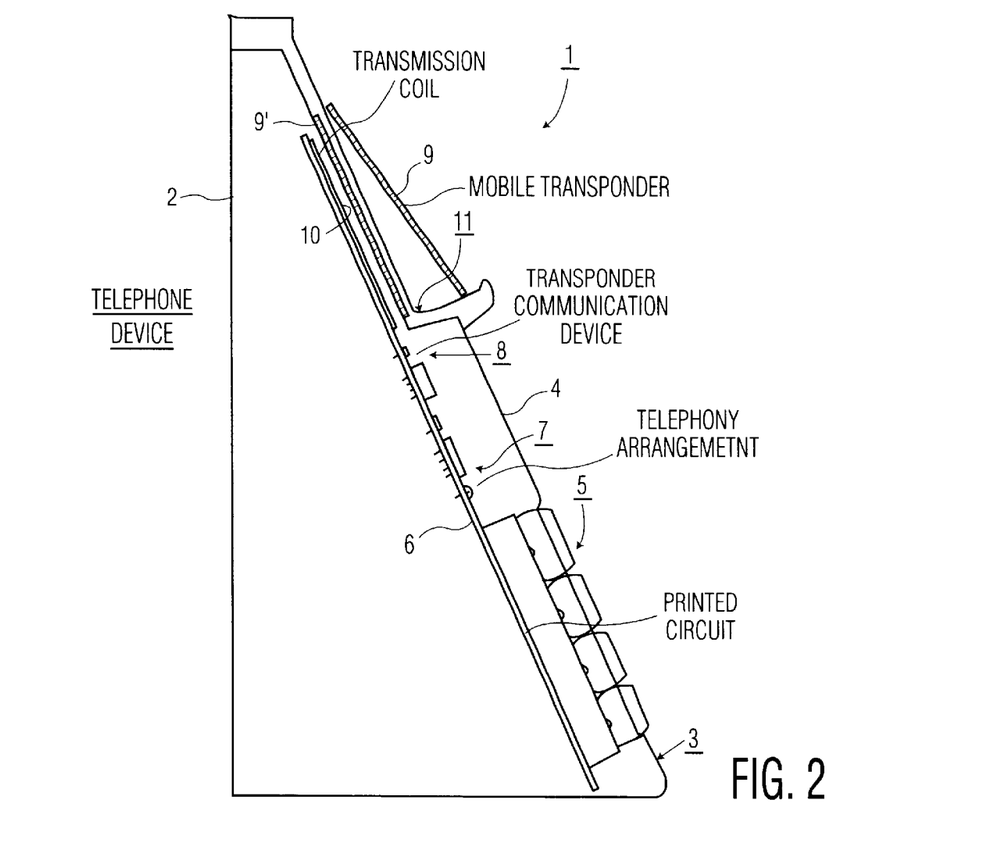
FIG. 2 is a diagrammatic cross-sectional view showing the telephone device of FIG. 1 to a larger scale than in FIG. 1.

In the telephone device 1 shown in FIGS. 1 and 2 the printed circuit board 6 also carries a transponder communication device 8, i.e. an electronic transponder communication arrangement, as is also shown diagrammatically in FIG. 2. The transponder communication device 8 serves for the contactless communication with mobile transponders 9. For the contactless communication with such mobile transponders 9 the transponder communication device 8 comprises a coil stage which includes a transmission coil 10, which in the present case is very simply formed by an etched coil formed on the printed circuit board 6.

To receive a mobile transponder 9, as can be seen in FIG. 2, the telephone device 1 comprises a plastic holder 11, which is substantially L-shaped and into which a card-shaped mobile transponder 9 can be loaded in the manner shown in FIG. 2.

Hereinafter, the circuit arrangement of the transponder communication device 8 is described in more detail with reference to FIG. 3A.

The transponder communication device 8 comprises a microcomputer 12 by means of which a multitude of means and functions are realized, only some of which will be described in more detail hereinafter. Below only those functions and means realized by means of the microcomputer 12 will be described which are relevant in the present context.

Figure 3A:
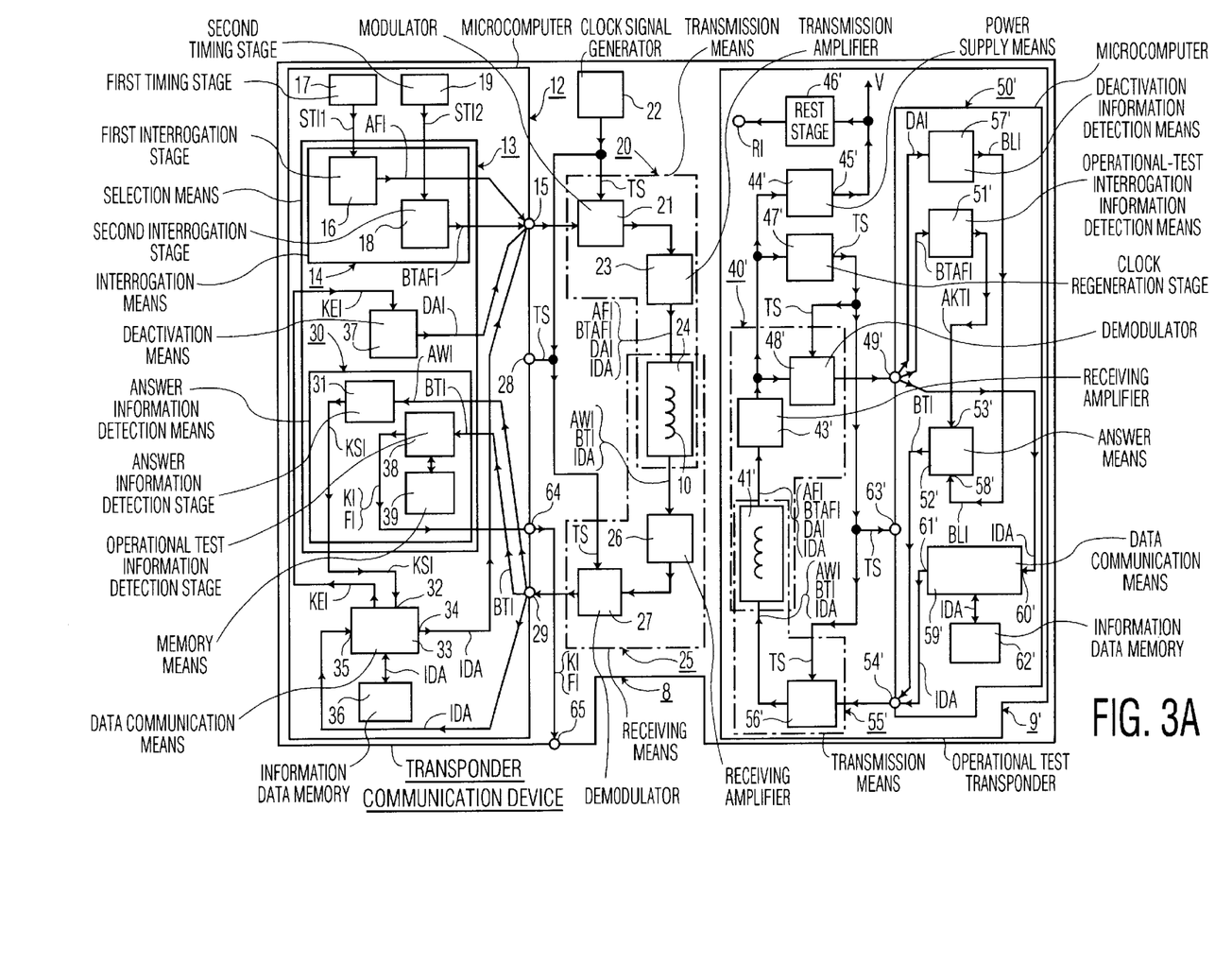
FIG. 3A is a block diagram which diagrammatically shows the electrical circuit arrangement of the transponder communication device.
Figure 3B:
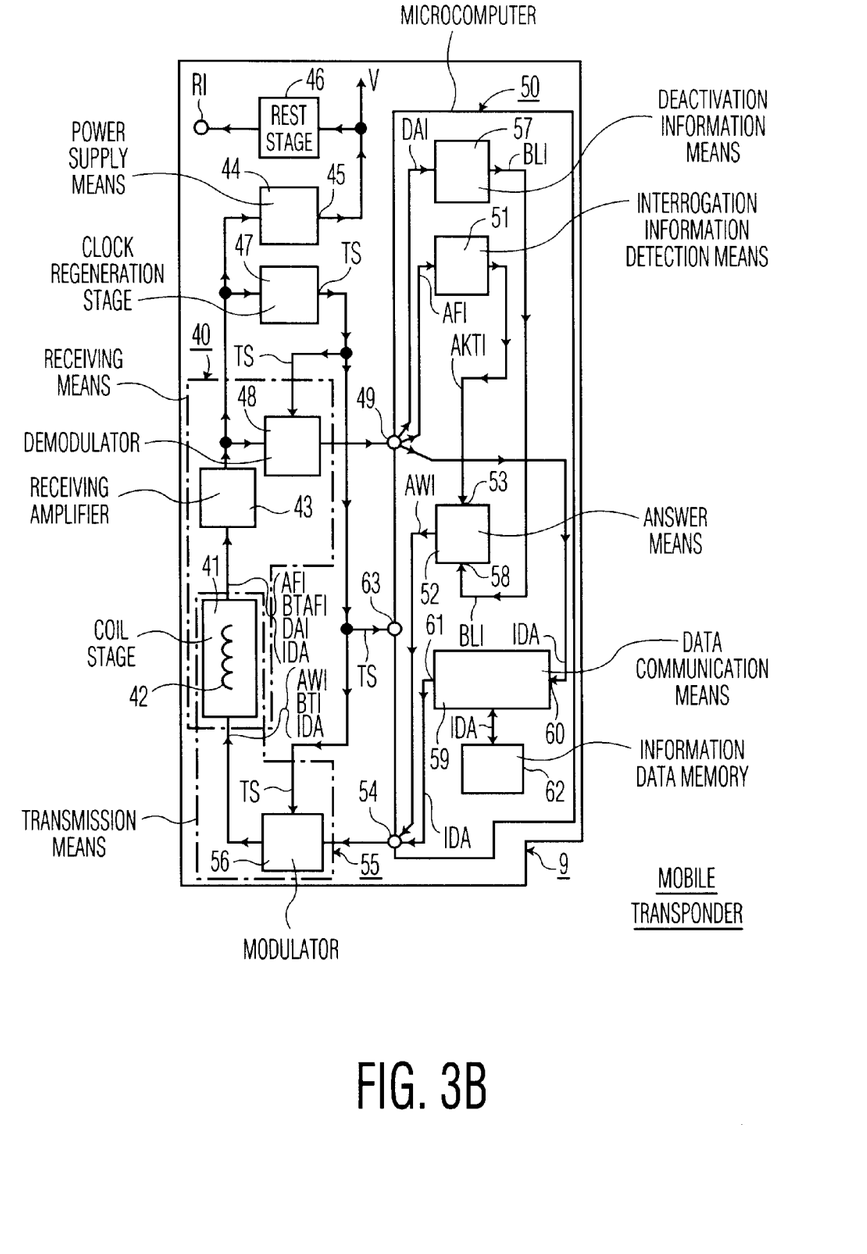
FIG. 3B is an electrical circuit arrangement of a mobile transponder.

By means of the microcomputer 12 selection means are realized, which serve for the individual selection of mobile transponders 9, shown in FIG. 3B, which are in an active state and which are situated in a receiving range of the transponder communication device 8. The selection means 13 comprise interrogation means 14 adapted to generate at least one type of interrogation information AFI, by means of which each mobile transponder 9 which is in an active state and situated in the receiving range of the transponder communication device 8 can be interrogated to generate and transmit answer information AWI. The at least one type of interrogation information AFI generated by the interrogation means 14 can be applied to an output 15 of the microcomputer 12.

The interrogation means 14 include a first interrogation stage 16, which can be controlled by a first timing stage 17. The first timing stage 17 supplies a first type of control information STI1 at constant time intervals, for example after every 100 ms or after every second, by means of which control information the first interrogation stage 16 is activated, after which the first interrogation stage 16 generates at least one type of interrogation information AFI and supplies it to the output 15 of the microcomputer 12.

The interrogation means 14 further include a second interrogation stage 18, which can be controlled by a second timing stage 19. The second timing stage 19 supplies a second type of control information STI2, also at constant time intervals, for example after every hour, ten hours or twenty hours, by means of which control information is applied to the second interrogation stage 18, after which the second interrogation stage 18 each time generates operational-test interrogation information BTAFI and supplies it to the output 15 of the microcomputer 12.

Each of the two types of interrogation information AFI and BTAFI generated by the interrogation means 14 can be applied to transmission means 20 provided and adapted to transmit the interrogation information AFI or BTAFI to the mobile transponders 9 situated in the receiving range. The transmission means 20 include a modulator 21, constructed in known manner as a pulse width modulator. However, alternatively the modulator 21 can be a phase modulator or a frequency modulator. A clock signal TS can be applied to the modulator 21, the transponder communication device 8 comprising a clock signal generator 22 for the generation of the signal TS. Interrogation information AFI or BTAFI modulated by means of the modulator 21 can be applied to a transmission amplifier 23, which applies the modulated interrogation information AFI or BTAFI, which has been amplified by the amplifier 23, to a coil stage 24, which includes the afore-mentioned transmission coil 10, which in known manner cooperates inductively with a transmission coil included in a mobile transponder 9.

The transponder communication device 8 further includes receiving means 25 provided and adapted to receive answer information AWI, which is generated and transmitted by mobile transponders 9 situated in the receiving range of the transponder communication device 8 in the response to interrogation information previously transmitted by the transponder communication device 8. The receiving means 25 also include the coil stage 24 comprising the transmission coil 10 by means of which the answer information AWI transmitted by a transmission coil of a mobile transponder 9 can be received in a receiving mode. Answer information AWI received by the transmission coil 10 can be applied to a receiving amplifier 26 of the receiving means 25. Modulated answer information AWI which has been amplified by the receiving amplifier 26 can be applied to a demodulator 27, which is for example a synchronous demodulator and which is capable of demodulating the normally amplitude-modulated answer information AWI applied to it. In the same way as to the modulator 27, the clock signal TS from the clock signal generator 22 can be applied to the demodulator 27. Moreover, another demodulator may be used depending on the transmission method. Furthermore, the clock signal TS can also be applied to a first input 28 of the microcomputer 12, as a result of which the clock signal TS is also available in the microcomputer 12, but this will not be discussed in any further detail because it is not relevant in the present context. The answer information AWI demodulated by means of the demodulator 27 can be applied to the second input 29 of the microcomputer 12.

The microcomputer 12 further forms answer information detection means 30 by means of which the presence of a mobile transponder 9 in the receiving range can be detected depending on the occurrence of answer information AWI of at least one type. The answer information detection means 30 include an answer information detection stage 31 arranged to receive demodulated answer information AWI from the second input 29. The answer information AWI supplied by a mobile transponder 9 can be detected by means of the answer information detection stage 31, after which it is known in the transponder communication device 8 with which specific mobile transponder 9 the transponder communication device 8 is in communication. As soon as the answer information detection stage 31 has detected a given type of answer information AWI and the transponder communication device 8 has thus detected with which specific mobile transponder 9 it communicates, the answer information detection stage 31 supplies communication start information KSI.

The communication start information KSI can be applied to a control input 32 of the data communication means 33. After selection of a mobile transponder 9 with the aid of data communication selection means data communication with the selected transponder 9 can be effected with the aid of the data communication means 33. To effect such data communication the data communication means 33 have an output 34 connected to the first output 15 of the microcomputer 12, via which the information data IDA supplied by the data communication means 33 can be applied to the transmission means 20 in order to be transmitted. Information data IDA received by a selected mobile transponder 9 can be applied from the receiving means 25 to an input 35 of the data communication means 33 via the second input 29 of the microcomputer 12. The data communication means 33 cooperate with an information data memory 36 into which information data IDA can be written with the aid of the data communication means 33 and from which information data IDA can be read with the aid of the data communication means 33.

In the present case the data communication means 33 are additionally adapted to generate communication end information KEI, which is generated when after selection of a mobile transponder 9 data communication with the data communication means of this selected transponder 9, effected with the aid of the data communication means 33, has ended, the communication end information KEI thus indicating that data communication has been completed.

The microcomputer 12 further forms deactivation means 37, to which the communication end information KEI can be applied. The communication end information KEI can control the deactivation means 37 in such a manner that upon reception of communication end information KEI the deactivation means 37 generate and supply deactivation information DAI, which information is supplied to the first output 15 of the microcomputer 12. With the aid of the deactivation information DAI a previously selected mobile transponder 9 can be set from its active state, in which it has been selected earlier and in which after its selection a data communication process has been carried out and completed, to an inactive state, which can be a standby state or a waiting state.

With respect to the transponder communication device 8 or its microcomputer 12 it is to be noted that the answer information detection means 30 further include an operational-test-information detection stage 38. This operational-test-information detection stage 38 will be described in more detail hereinafter. To cooperate with the operational-test-information detection stage 38 the transponder communication device 8 or its microcomputer 12 includes memory means 39, in which nominal operational test information is stored, which information can be applied to the operational-test-information detection means. The operational-test-information detection stage 38 is adapted to compare the applied nominal operational test information with operational test information also applied to it. The afore-mentioned application of operational test information will be described in more detail hereinafter.

The circuit arrangement of mobile transponder 9 communicating with the transponder communication device 8 shown in FIG. 3A will now be described hereinafter with reference to FIG. 3B.

The mobile transponder 9 includes receiving means 40 for receiving at least one type of interrogation information AFI which can be generated and transmitted by means of the transponder communication device 8. The receiving means 40 include a coil stage 41, which comprises a transmission coil 42. Interrogation information AFI received by means of the transmission coil 42 can be applied to a receiving amplifier 43. Information and data amplified by means of the receiving amplifier 43 can be applied to power supply means 44, which derive power from the received information and data signals, so as to produce a supply voltage V on an output 45 of the power supply means 44, which voltage can power all the parts of the mobile transponder 9 which require a supply voltage. The power supply means 44 have their output 45 connected to a rest stage 46, which is capable of generating rest information RI when the voltage V derived by means the power supply means 44 is high enough. By means of the reset information RI those parts of the mobile transponder 9 which require this can be reset to a given operational state. This involves known measures, so that these will not be described.

The interrogation information AFI and other data received with the aid of the receiving means 40 can further be applied to a clock regeneration stage 47 by means of which a clock signal TS can be regenerated from the received answer information and data, which clock signal can be supplied by the clock regeneration stage 47 and is in synchronism with the clock signal TS in the transponder communication device 8.

The receiving means 40 comprise a demodulator 48, which is formed by a pulse-width demodulator. The demodulator can alternatively be a phase demodulator or a frequency demodulator. The regenerated clock signal TS can be applied to the demodulator 48. Demodulated interrogation information AFI and any other demodulated data can be applied from the demodulator 48 to a first input 49 of a microcomputer 50 of the mobile transponder 9. By means of the microcomputer 50 a multitude of means and functions are realized, only some of which are described in more detail hereinafter.

By means of the microcomputer 50 interrogation information detection means 51 of the mobile transponder 9 are realized for detecting at least one type of interrogation information AFI. After the detection of interrogation information AFI the interrogation information detection means can generate and supply activation information AKTI.

The microcomputer 50 further forms answer means 52 which are adapted to generate answer information AWI forming an answer to interrogation information AFI detected with the aid of the interrogation information detection means 51. The answer means then generate answer information AWI when activation information AKTI is applied—from the interrogation information detection means 51 - to an activation input 53. Answer information AWI generated by the answer means 52 can be supplied to an output 54 of the microcomputer 50 and can be applied from this output 54 to transmission means 55 of the mobile transponder 9.

The transmission means 55 serve and are adapted to transmit answer information AWI generated by the answer means 52. The transmission means 55 include a modulator 56, to which likewise the regenerated clock signal TS can be applied and by means of which, depending on answer information AWI applied to it and on other data applied it, a so-called load modulation of the unmodulated clock signal TS, which has been supplied to the transponder communication device 8, can be applied via the transmission coil 42 of the mobile transponder 9 and via the transmission coil 10 of the transponder communication device 9, which is inductively coupled to the first-mentioned transmission coil, data communication from the mobile transponder 9 to the transponder communication device 8 being effected by means of this load modulation.

Furthermore, deactivation information detection means 57 are realized by means of the microcomputer 50 of the mobile transponder 9, which detection means serve and are adapted to detect deactivation information DAI transmitted by the transponder communication device 8. The deactivation information means 57 can generate and supply inhibit information BLI upon each detection of deactivation information DAI. The generated inhibit information BLI can be applied to an inhibit input 58 of the answer means 52. The answer means 52 are responsive to the inhibit information BLI to inhibit the generation of answer information AWI by the answer means 52.

With regard to the mobile transponder 9 it is to be noted that the mobile transponder 9 includes data communication means 59 implemented by means of the microcomputer 50, which data communication means have an input 60 connected to the first input 49 of the microcomputer and via this first input 49 to the receiving means 40 and have an output 61 connected to the output 54 of the microcomputer 50 and, via this output 54, to the transmission means 55. The data communication means 59 of the mobile transponder 9 cooperate with an information data memory 62, into which information data IDA can be written with the aid of the data communication means 59 and from which information data IDA can be read with the aid of the data communication means 59.

Furthermore, it is to be noted with regard to the mobile transponder 9 that the regenerated clock signal TS can also be applied to the microcomputer 50 via a second input 63 of the microcomputer 50, as a result of which the regenerated clock signal TS is also available in the microcomputer 50, but no further reference is made to this because it is not relevant in the present case.

The transponder communication device 8 shown in FIG. 3A now advantageously includes means for carrying out an operational test. These means for carrying out an operational test comprise the second timing stage 19, the second interrogation stage 18 for the generation of operational test interrogation information BTAFI, the transmission means 20, the receiving means 25, the operational test detection means 38, and memory means 39 which cooperate with the operational-test-information detection means 38, and finally they comprise, in addition, an operational test transponder 9'.

With respect to the operational test transponder 9' it is to be noted that its circuit arrangement, as regards its hardware, is wholly identical to the circuit arrangement of the mobile transponder 9. For this reason, the operational test transponder 9', shown in FIG. 3B and the parts of the operational test transponder 9' bear the same reference signs as the mobile transponder 9 and the parts of the mobile transponder 9, but the reference signs of the operational test transponder 9' and the parts of the operational test transponder 9' are primed.

The operational test transponder 9' of the transponder communication device 8, as can be seen in FIG. 2, is detachably secured inside the holder 11, so that the operational test transponder 9' is exchangeable. As is also apparent from FIG. 2, the operational test transponder 9' is disposed directly adjacent the transmission coil 10 of the transponder communication device 8, so that the operational test transponder 9' is always situated within the receiving range of the transponder communication device 8. The operational test transponder 9' is also capable of communicating with the transponder communication device 8 when mobile transponders 9 are situated in the receiving range of the transponder communication device 8.

The operational test transponder 9' includes means for generating and means for transmitting operational test information BTI. The means for generating the operational test information BTI of the operational test transponder 9' of the transponder communication device 8 are formed by the answer means 52' of the operational test transponder 9', which correspond to the answer means 52 of the mobile transponder 9. In the case of the operational test transponder 9' the answer means 52', however, do not supply answer information AWI but operational test information BTI, which is simple to achieve with the aid of software.

The means 52' for the generation of operational test information BTI can be activated by operational-test-interrogation-information detection means 51', which correspond to the interrogation information detection means 51 of the mobile transponder 9. The operational test interrogation information BTAFI generated by means of the second interrogation stage 18 of the interrogation means 14 can be applied to the operational-test-interrogation-information detection means 51'. After having received such operational test interrogation information BTAFI the operational-test-interrogation-information detection means 51' supply activation information AKTI to the means 52' in order to generate operational test information BTI, after which the means 52' generate operational test information BTI, which is applied to the output 54' of the microcomputer 50' and the transmission means 55' in order to be transferred to the operational test information detection means 38 via the receiving means 25. The received operational test information BTI transmitted by the operational test transponder 9' can also be detected by the operational test information detection means 38 when mobile transponders 9 are situated within the receiving range of the transponder communication device 8.

When the means 52' apply operational test information BTI to the operational test information detection means 38 via the transmission means 55' and the receiving means 25, said means 38 compare the operational test information BTI applied to it with the nominal operational test information supplied to it by the memory means 39. When it is detected that the applied operational test information BTI is valid, the operational test information detection means 38 supply validity information KI, which is applied to a further output 64 of the microcomputer 12 and which is transferred from the further output 64 to an output 65 of the transponder communication device 8. When the operational test information detection means 38 detect information which deviates from valid operational test information BTI, they supply error information FI to the further output 64 of the microcomputer 12, which error information FI, in the same way as the validity information KI, is applied to the output 65 of the transponder communication device 8. Information which is found to deviate from the valid operational test information BTI by the operational test information detection means 38 can be, for example, disturbed or erroneous operational test information but it can also be the complete absence of information.

In the present case the information KI or FI appearing on the output 65 of the transponder communication device 8 is used for controlling the telephony arrangement 7 of the telephone device 1 shown in FIGS. 1 and 2. When the operational test information detection means 38 detect valid operational test information BTI and, consequently, validity information KI appears on the output 65 of the transponder communication device 8, this validity information KI enables the telephony arrangement 7 of the telephone device 1 to be used. Conversely, if the operational test information detection means 38 do not detect information valid operational test information BTI but information which deviates from valid operational test information BTI, in which case error information FI occurs on the output 65 of the transponder communication device 8, this error information FI causes the telephony arrangement 7 of the telephone device 1 to be disabled, as a result of which telephoning is inhibited. This can, in addition, be indicated by optical warning means on the telephone device 1. Furthermore, the appearance of error information FI on the output 65 of the transponder communication device 8 is used advantageously, by means of the telephone network to which the telephone device 1 is connected, to transfer error-message information to a central telephone service station, so that the central telephone service station is automatically notified that a fault condition, detected by means of the operational test carried out previously, occurs in the telephone device 1 which includes the transponder communication device 8. Such an operational test can also be referred to as a self-test.

In the transponder communication device 8 as shown in FIG. 3 such an operational test or self-test is activated automatically after a given time interval, for example after every ten hours. The operational test is activated by means of the second timing stage 19, which supplies control information STI2 to the second interrogation stage 18 of the interrogation means 13 every ten hours. The second interrogation stage 18 subsequently generates operational test interrogation information BTAFI, which is transmitted to the operational test transponder 9' via the transmission means 20 and via the receiving means 40'. It is obvious that the generated operational test interrogation information BTAFI is also transmitted to the mobile transponder 9, which is also situated within the receiving range of the transponder communication device 8, via the transmission means 20 and the receiving means 40 but has no effect in this mobile transponder 9. In the operational test transponder 9' this operational test interrogation information BTAFI is detected by means of the operational test interrogation information detection means 51', as a result of which the means 52' for generating operational test information generate such operational test information BTI. The generated operational test information BTI is subsequently transmitted to the operational test information detection means 38 via the transmission means 55' of the operational test transponder 9' and via the receiving means 25, which detection means carry out a detection and then supply either validity information KI or error information FI.

With the telephone device 1 described hereinbefore, or rather the transponder communication device 8 included in this telephone device 1, it is achieved in an advantageous manner that the proper working order of the transponder communication device 8 can be tested regularly in a simple manner. Moreover, it is achieved in particular that a very reliable, trouble-free, vandal proof and simple construction is obtained, for which during a testing process, i.e. an operational test, it is not necessary to first remove a mobile transponder 9 from the transponder communication device 8 to be tested and even a multitude of other mobile transponders 9 may be situated within the receiving range of the transponder communication device 8 in accordance with the invention without an operational test being affected or rendered impossible thereby. Furthermore, it is particularly advantageous that no mechanically moved parts are required in the telephone device 1, i.e. its transponder communication device 8, to carry out a testing process, which has the advantage of low manufacturing costs of the telephone device 1 and a high dependability and reliability of operation of the telephone device 1 and of the transponder communication device 8 included therein.

Figure 4:
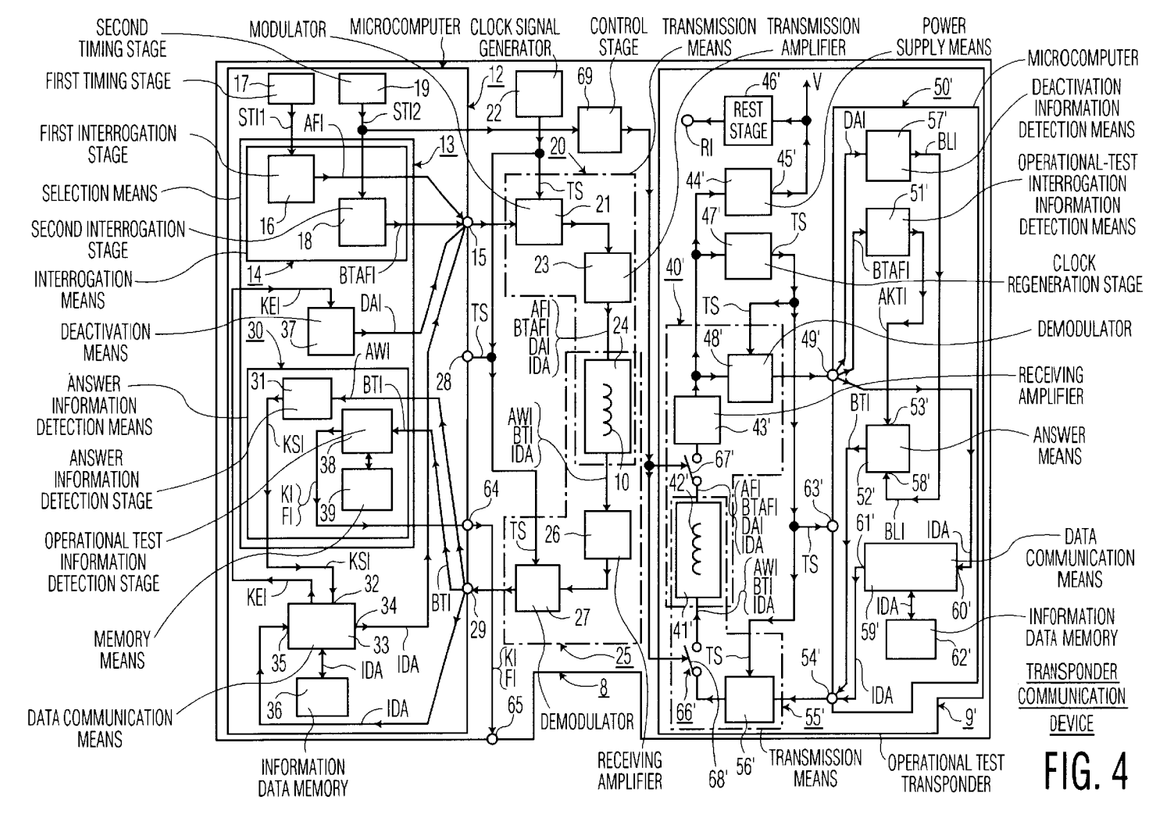

FIG. 4 shows a transponder communication device 8 in accordance with a second embodiment o; the invention. The circuit arrangement of this transponder communication device 8 essentially corresponds to the circuit arrangement of the transponder communication device 8 in accordance with the first embodiment of the invention shown in FIG. 3. However, in the transponder communication device as shown in FIG. 4 the operational test transponder 9' includes switching means 66' by which the operational test transponder 9' can be activated and deactivated. The switching means 66' comprise two diagrammatically shown electronic switches 67' and 68' arranged in series with the coil stage 41', which switches enable the connection between the coil stage 41' and the other circuit parts of the operational test transponder 9' to be interrupted. The two electronic switches 67' and 68' can be controlled by a control stage 69, which in its turn can be controlled by the second timing stage 19. As already stated, the timing stage 19 can generate control information STI2 at constant time intervals, by means of which control information the switching means 66' of the operational test transponder 9', i.e. the two switches 67' and 68', can be switched so as to disable the operational test transponder 9'.

It is to be noted that the switching means 66' of the operational test transponder 9' need not necessarily be controllable by the transponder communication device but may alternatively be controllable by any device which includes a transponder communication device, for example by a telephone device including a transponder communication device.

In the transponder communication device 8 as shown in FIG. 4 the transponder communication device 8 itself as well as the operational test transponder 9' are advantageously accommodated on a common printed circuit board, so that the electrically conductive connections between the control stage 69 and the two electronic switches 67' and 68' can simply be formed by conductor tracks.

By providing the switching means 66' it is simply achieved that the operational test transponder 9' can be disabled easily and therefore cannot adversely affect the communication quality in the normal communication mode between the transponder communication device 8 and a mobile transponder 9. Another advantage of this is that the operational test transponder 9' is activated automatically at regular time intervals to carry out an operational test.

The invention is not limited to the two embodiments described hereinbefore, which relate to a transponder communication device included in a telephone device. The measures in accordance with the invention can also be used advantageously in transponder communication devices which form part of other apparatuses, devices or systems. In the description of the two embodiments the individual selection of the transponders has not been described in detail and therefore it is mentioned here that it is known and customary to carry out a so-called anti-collision protocol during the cooperation between transponder communication devices and transponders, enabling each transponder to be selected individually, i.e. in the present case also an operational test transponder.

What is claimed is:

1. A transponder communication device for contactless communication with a mobile transponder: the transponder communication device comprising:

interrogation means for generating interrogation information in response to which the mobile transponder, when in an active state, generate and transmit answer information;

transmission means for transmitting the interrogation information to the mobile transponder;

receiving means for receiving the answer information;

answer information detection means for detecting the presence of the mobile transponder depending on the occurrence of the answer information;

an operational test transponder detachably secured in the transponder communication device for testing the transponder communication device when mobile transponders are situated within a receiving range of the transponder communication device and the operational test transponder including means for generating and for transmitting operational test information to be received by the receiving means of the transponder communication device;

operational test information detection means connected to the receiving means and configured to detect received operational test information and configured to generate error information when the received operational test information deviates from valid operational test information.

2. A transponder communication device of claim 1, wherein the transponder communication device includes memory means for storing nominal operational test information to be applied to the operational-test-information detection means, the operational-test-information detection means being configured to compare the nominal operational test information with the received operational test information.

3. A transponder communication device of claim 1, wherein the means for generating operational test answer information are configured to generate answer information.

4. A transponder communication device of claim 1, wherein the operational test transponder includes switching means for activating and deactivating the operational test transponder.

5. A transponder communication device of claim 1, wherein the transponder communication device comprises a timing stage for generating activation information, the switching means using the activation information to activate the operational test transponder.

6. A transponder communication device of claim 1, wherein the operational test transponder is detachably mounted in the transponder communication device.

7. A transponder for contactless communication with a transponder communication device, which transponder is configured, when in an active state, to communicate with a transponder communication device, the transponder including:

receiving means for receiving interrogation information transmitted by the transponder communication device;

interrogation information detection means for detecting received interrogation information;

answer means controllable by the interrogation information detection means to generate answer information in response to the detected interrogation information;

transmission means for transmitting the answer information;

means for generating operational test information to be transmitted to the transponder communication device by the transmission means.

8. A transponder of claim 8, wherein the means for generating operational test information are configured to generate answer information.

9. A transponder as claimed in claim 7, comprising switching means for activating and deactivating the transponder.

10. A transponder communication device comprising:

a transmitter;

a test transponder detachably secured in the transponder communication device for testing the transponder communication device and for transmitting test answer information in response to test interrogation information transmitted by the transmitter, the test transponder being permanently within a receiving range of the transponder communication device;

a receiver for receiving the test answer information;

detecting means for generating error information on the basis of a comparison of the received test answer information with nominal operational information.

11. A transponder communication device of claim 10, further comprising a memory circuit for storing the nominal operational information.

12. A transponder communication device of claim 10, wherein the test transponder comprises switching means for activating and deactivating the test transponder.

13. A transponder communication device of claim 12, wherein the transponder communication device comprises a timing stage for generating activation information in response to which the switching means activate the test transponder.

14. A transponder communication device of claim 10, wherein the test transponder is detachably mounted within the transponder communication device.

15. A telephony device comprising:

a transponder communication device comprising a transmitter;

a test transponder detachably secured in the transponder communication device for testing the transponder communication device and for transmitting test answer information in response to test interrogation information transmitted by the transmitter, the test transponder being permanently within a receiving range of the transponder communication device;

a receiver for receiving the test answer information;

detecting means for generating error information on the basis of a comparison of the received test answer information with nominal operational information.

16. A telephony device of claim 15 further comprising:

a telephony arrangement, and;

optical warning means for indicating a deactivation of the telephony arrangement by the detecting means in response to the error information.

17. A telephony device of claim 15, wherein the detecting means provides a telephone service station with the error information.

18. A test transponder comprising:
- a receiver for receiving interrogation information from a transponder communication device;
- answer means for generating answer information in response to the received interrogation information;
- transmitting means for transmitting the answer information;
- means for generating operational test information in response to test interrogation information from the transponder communication device, the test transponder being permanently within a receiving range of the transponder communication device.

19. A transponder of claim 18, wherein the answer means generate the operational test information.

20. A transponder of claim 18, further comprising switching means for activating and deactivating the transponder.

21. The transponder communication device of claim 10, wherein the transmitter automatically and periodically transmits test interrogation information to the test transponder.

\* \* \* \* \*